(12) United States Patent
Nakakubo et al.

(10) Patent No.: US 6,922,212 B2
(45) Date of Patent: Jul. 26, 2005

(54) PORTABLE ELECTRONIC DEVICE HAVING A ROTATABLE CAMERA

(75) Inventors: Koji Nakakubo, Kawasaki (JP); Katsumi Takada, Kawasaki (JP); Hiroyuki Kawai, Kawasaki (JP); Kiyoshi Nakamichi, Kato (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/336,829

(22) Filed: Jan. 6, 2003

(65) Prior Publication Data

US 2004/0017479 A1 Jan. 29, 2004

(30) Foreign Application Priority Data

Jul. 24, 2002 (JP) ........................................ 2002-214914

(51) Int. Cl.⁷ .............................................. H04N 5/225
(52) U.S. Cl. ........................................ 348/373; 348/376
(58) Field of Search ................................ 348/373, 376, 348/552, 375, 207.1, 208.16, 333.06, 14.01, 14.03; 455/556, 557, 566, 66; 396/291, 429

(56) References Cited

U.S. PATENT DOCUMENTS

| | | | | |
|---|---|---|---|---|
| 5,528,285 A | * | 6/1996 | Morikawa et al. | 348/14.01 |
| 5,825,408 A | * | 10/1998 | Yuyama et al. | 348/14.01 |
| 5,903,706 A | * | 5/1999 | Wakabayashi et al. | 386/117 |
| 6,445,417 B1 | * | 9/2002 | Yoshida et al. | 348/374 |
| 6,532,035 B1 | * | 3/2003 | Saari et al. | 348/14.02 |
| 6,552,720 B1 | * | 4/2003 | Gartrell et al. | 345/184 |
| 6,697,117 B1 | * | 2/2004 | Park | 348/373 |
| 2002/0048459 A1 | * | 4/2002 | Mishio | 396/429 |
| 2002/0158987 A1 | * | 10/2002 | Shimizu | 348/364 |

FOREIGN PATENT DOCUMENTS

| | | | | |
|---|---|---|---|---|
| JP | 10-051665 | * | 2/1998 | H04N/5/222 |
| JP | 2000-201337 | | 7/2000 | |
| JP | 2002-185589 | * | 6/2002 | H04N/5/225 |

* cited by examiner

*Primary Examiner*—Tuan Ho
*Assistant Examiner*—Heather R. Long
(74) *Attorney, Agent, or Firm*—Staas & Halsey LLP (57) ABSTRACT

A portable electronic device is capable of protecting a camera against impact from outer peripheries of a casing, and clearly indicating the passage of the camera through an image-inversion position. A camera (30) is rotatably installed in a casing (40). Windows (40d, 40e), through which the camera is able to view the outside of the casing and to be operated to rotate by a user, are formed in a front wall (40a) and a rear wall (40b), respectively, of the casing. Each of frames enclosing the windows, respectively, has a part which lies near an outer peripheral side of the casing and which is constituted by a bridge portion (44) connected with the casing. In this construction, all the outer peripheral sides of the camera (30) excepting those corresponding to the front and rear sides of the casing are covered with the casing and the bridge portion (44). As a result, an impact applied to the camera from a peripheral side of the casing adjacent to the bridge portion can be blocked by the bridge portion. In addition, when the camera is rotated to move the shooting or picture-taking plane thereof to the front side or the rear side of the casing, the image on the display becomes dark at a time for example, and hence the user is able to clearly recognize that the camera has passed an image-inversion position. A control part performs prescribed control based on an image of a wall of the casing which is taken by the camera and which lies between the front side and the rear side.

19 Claims, 9 Drawing Sheets

PORTABLE ELECTRONIC DEVICE HAVING A ROTATABLE CAMERA

BACKGROUND OF THE INVENTION

1. Field of the Invention

The present invention relates to a portable electronic device, and more particularly, it relates to a portable electronic device provided with a camera that is able to be rotated or swung by manual operation of a user to easily change its viewing or picture-taking direction. Here, note that the portable electronic device in the present invention indicates, for example, a mobile phone, a notebook-sized personal computer, a PDA (personal digital assistant), a digital camera, a digital video camera, etc.

2. Description of the Related Art

Figure 12:
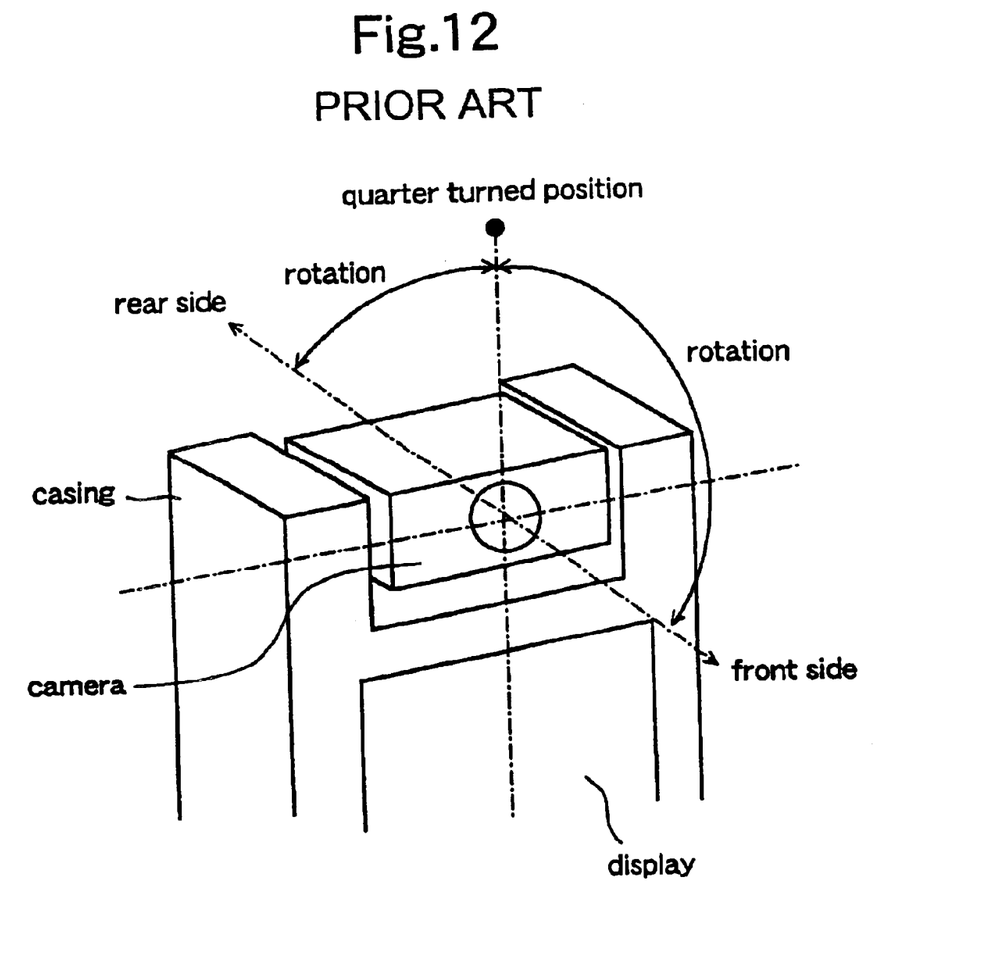
FIG. 12 is a view for explaining the arrangement of a camera in a prior art example.

In the past, for such kinds of portable electronic devices, there have been known a portable video conferencing telephone apparatus that can be carried by a user, as disclosed in Japanese Patent Application Laid-open No. Hei 6-284418, a portable personal computer as described in Japanese Patent Application Laid-open No. 2000-20164, etc., for instance. As shown in FIG. 12, these apparatus and computer include a camera that is arranged for forward and reverse rotation in a concave portion which is formed in one side of a casing by cutting it out in its upper central portion from its outer periphery to a predetermined depth. This camera is constructed such that the viewing direction thereof is rotatable in a range of 180 degrees in a forward direction from the front side of the casing to the rear side thereof through a camera inversion position (i.e., an upright or quarter-turned position) or vice versa so as to allow the camera to take pictures from the front side to the rear side of the casing.

In the conventional portable electronic devices as described above, the camera is arranged for free forward and reverse rotation in the concave portion which is formed by cutting a part of the casing from its outer periphery, and hence the portions of the camera lying at the cut-out peripheral side of the casing is in a state of being exposed to the outside. Accordingly, when such a portable electronic device is dropped by mistake, an impact would be imposed on the camera from the cut-out peripheral side of the casing, thus giving rise to a danger that the camera might be damaged.

In addition, when the viewing direction of the camera lies in the vicinity of the upright or quarter-turned position, it is not easy for one to know if the viewing direction has been changed to the front side or the rear side, and hence one might sometimes take pictures at an unintended side. Thus, there is also a demand that the inversion of the viewing direction of the camera should be made clear to the user.

SUMMARY OF THE INVENTION

The present invention is intended to solve the problems as referred to above, and has for its one object to provide a portable electronic device which is capable of protecting a camera against an impact imposed thereon from the outer peripheries of a casing.

Another object of the present invention is to provide a portable electronic device in which one is able to clearly know the passage of a camera through an inversion or upright position.

A further object of the present invention is to provide a portable electronic device which is capable of automatically changing an inverted image of a photographed object into an erect image thereof when a camera has passed through an inversion or upright position.

In order to solve the above-mentioned problems, according to a first aspect of the present invention, there is provided a portable electronic device including a camera rotatably mounted on a casing having a front wall and a rear wall, and a display for displaying thereon an image taken by the camera at the front wall of the casing. The camera is disposed in the casing at a location between the front side and the rear side thereof. The casing has a pair of windows which are formed in, and enclosed on their peripheries by, the front and rear walls thereof, respectively, and through which the camera is operated to rotate by a user and allowed to view the outside of the casing so as to ensure its field of view. The camera is rotatably supported on the casing through a rotational operation mechanism which is rotated by the user through the windows formed in the front and rear walls, respectively, from outside of the casing thereby to change a direction of view of the camera in a range between a direction of the front wall and a direction of the rear wall.

According to such an arrangement, the camera disposed in the casing is able to take pictures through the windows in the casing and at the same time it is also able to be rotated by a user. In this case, the peripheral portions of the camera are covered with the casing except for the front side and the rear side thereof. Accordingly, the camera is not exposed to the outside of the casing unlike the prior art as described above. As a result, the camera is protected by the casing against external impact. In addition, when the field of view of the camera lies between the window in the front wall and the window in the rear wall during the camera is being turned from the front side to the rear side, the photographed image displayed on the display temporarily becomes dark. Accordingly, by checking it visually, the user can easily learn an inversion position of an image taken by the camera, i.e., an upright or quarter-turned position of the camera. Here, note that the portable electronic device in the present invention indicates, for example, a mobile phone, a notebook-sized personal computer, a PDA (personal digital assistant), a digital camera, a digital video camera, etc.

According to a second aspect of the present invention, there is provided a portable electronic device comprising: a casing having a front wall and a rear wall, a camera disposed in a space between the front and rear walls of the casing so as to be rotatable in a direction from the front wall to the rear wall or vice versa, a display provided on the front wall of the casing for displaying thereon an image taken by the camera, a first window which is formed in the front wall of the casing and through which the camera is able to view the outside of the casing and is operated to rotate by a user, a second window which is formed in the rear wall of the casing, and through which the camera is able to view the outside of the casing and is operated to rotate by the user, and a bridge portion disposed in a peripheral portion of the casing connecting between the front and rear walls of the casing for forming a part of each of frames for the first and second windows.

According to such an arrangement, the bridge portion can serve to prevent an impact from the outer peripheries of the casing from being imposed directly on the camera. Moreover, by taking a picture of the bridge portion, the user can easily know that the camera is either at an inverted image position or at an erect image position. In this case, it is preferable that the bridge portion have such a rigidity capable of protecting the camera from the impact applied thereto from the peripheries of the casing. The configuration of the bridge portion may be arbitrary and is not limited to plate shapes as shown in preferred embodiments of the present invention to be described later. For instance, in cases where the camera is arranged in the vicinity of a corner portion of the casing, the bridge portion may have a configuration conforming to the shape of the corner (for instance, a curved configuration connecting two intersecting end faces (end walls) of the casing).

Preferably, in the portable electronic device according to the second aspect of the present invention, the casing has an end wall in a peripheral portion of the casing for connecting between corresponding ends of the front wall and the rear wall. The first window is formed to extend from the front wall to the end wall, and the second window is also formed to extend from the rear wall to the end wall. In this case, preferably, the end wall has a thickness equal to a distance between the front wall and the rear wall, and a width in a direction perpendicular to a thicknesswise direction. The bridge portion extends in the widthwise direction of the end wall and has a thickness less than that of the end wall.

With the above arrangements, it becomes easy for the user to carry out an operation of turning or rotating the camera, thus making it possible to change the viewing direction of the camera in an easy and quick manner.

Preferably, in the portable electronic device according to the second aspect of the present invention, the bridge portion has such a width that it is able to cover the whole or a part of a prescribed proportion or more of the shooting range of the camera at least at a certain rotational position of the camera during the time when the camera is being rotated to reach the bridge portion.

With this arrangement, if an image taken by the camera is displayed on the display when the whole or a part (the prescribed proportion or more) of the shooting range of the camera is covered with the bridge portion, the screen of the display becomes very dark at that moment. As a result, the user of the camera can readily learn that the shooting or picture-taking plane of the camera has been switched from the front side to the rear side or vice versa.

Preferably, in the portable electronic device according to the second aspect of the present invention, the bridge portion includes a prescribed pattern, a picture of which is to be taken by the camera. Thus, by taking a picture of such a pattern, the camera user can readily learn a switching of the shooting plane of the camera from the front side to the rear side or vice versa.

Preferably, in the portable electronic device according to the second aspect of the present invention, the bridge portion is integrally molded to the casing. In addition, it is preferable that an image display panel with the display mounted thereon and a switch operation panel with a switch mounted thereon be integrally connected with each other in a foldable manner, with the camera being disposed between the display and an outer peripheral portion of the casing of the image display panel.

In a preferred form of this case, the camera is rotatable about an axis which is parallel to a folding axis about which the image display panel and the switch operation panel are foldable with respect to each other. Such an arrangement is suitable when the camera is arranged in the vicinity of an upper peripheral portion or a lower peripheral portion of the casing. In another preferred form, the camera is rotatable about an axis perpendicular to a folding axis about which the image display panel and the switch operation panel are foldable with respect to each other. This arrangement is suitable when the camera is arranged at a location near a side peripheral portion of the casing.

According to a third aspect of the present invention, there is provided a portable electronic device comprising a casing having a front wall and a rear wall, a camera disposed in a space between the front and rear walls of the casing so as to be rotatable in a direction from the front wall to the rear wall or vice versa, a display provided on the front wall of the casing for displaying thereon an image taken by the camera, a first window which is formed in the front wall and through which the camera is able to view the outside of the casing, a second window which is formed in the rear wall and through which the camera is able to view the outside of the casing, a bridge portion disposed in a peripheral portion of the casing connecting between the front and rear walls of the casing for forming a part of each of frames for the first and second windows, and a control part for performing prescribed control based on an image of the bridge portion taken by the camera.

Preferably, in the portable electronic device according to the third aspect of the present invention, the bridge portion includes a prescribed pattern a picture of which is to be taken by the camera, the control part being operable to perform the prescribed control based on an image of the prescribed pattern taken by the camera.

In a preferred form of this arrangement, the control part can control the display in such a manner that an indication is made on the display to the effect that the shooting plane of the camera has been changed from the front side to the rear side or vice versa. Alternatively, in another preferred form, the control part controls the display in such a manner that an inverted image taken by the camera is turned upside down to provide an erect image on the display.

According to a fourth aspect of the present invention, there is provided a portable electronic device including a camera and a display for displaying an image taken by the camera, the camera and the display being disposed in a casing. The camera is disposed in, and mounted on, the casing for rotation in a direction from a front side to a rear side of the casing or vice versa. The casing has a pair of windows formed at its front side and rear side, respectively, through which the camera views the outside of the casing. A control part is provided for performing prescribed control based on an image of a wall of the casing which is taken by the camera and which lies between the front side and the rear side.

With such an arrangement, the bridge portion can serve to prevent an impact from being imposed on the camera. In addition, the control part is able to notify the camera user of a switching of the shooting plane of the camera from the front side to the rear side or vice versa by making an indication thereof. It is thought that for such an indication performed by the control part, there are a variety of kinds of display methods such as a method of making the whole screen of the display dark, a method of displaying a message on the display screen to the effect that the shooting plane of the camera has been changed from the front side to the rear side or vice versa, etc.

Further, it is also possible that the control part automatically inverts the photographic image displayed on the display upside down when the camera changes its viewing direction from the front side to the rear side or from the rear side to the front side. According to this method, the user can always visually recognize an erect image irrespective of the rotational state or position of the camera.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings.

Embodiment 1.

Figure 1:
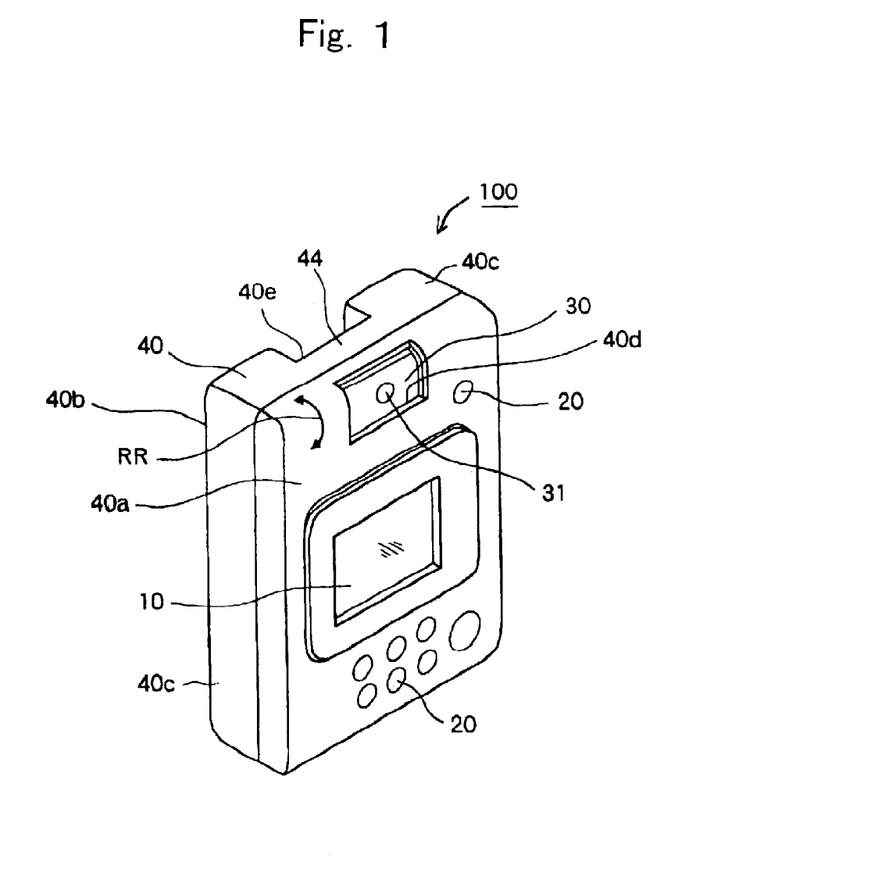
FIG. 1 is an external view showing a portable electronic device according to a first embodiment of the present invention.
Figure 2A:
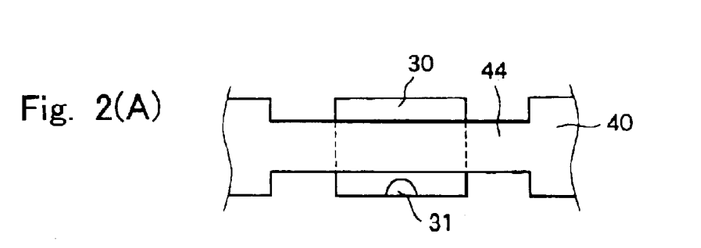
FIG. 2(A) is a view showing a state of the portable electronic device of FIG. 1 in which the lens of a camera is directed to a front side of a casing.
Figure 2B:
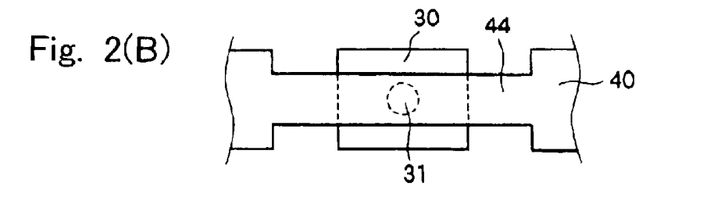
FIG. 2(B) is a view showing another state of the portable electronic device of FIG. 1 in which the lens of the camera is turned to an upper peripheral side of the casing.
Figure 3:
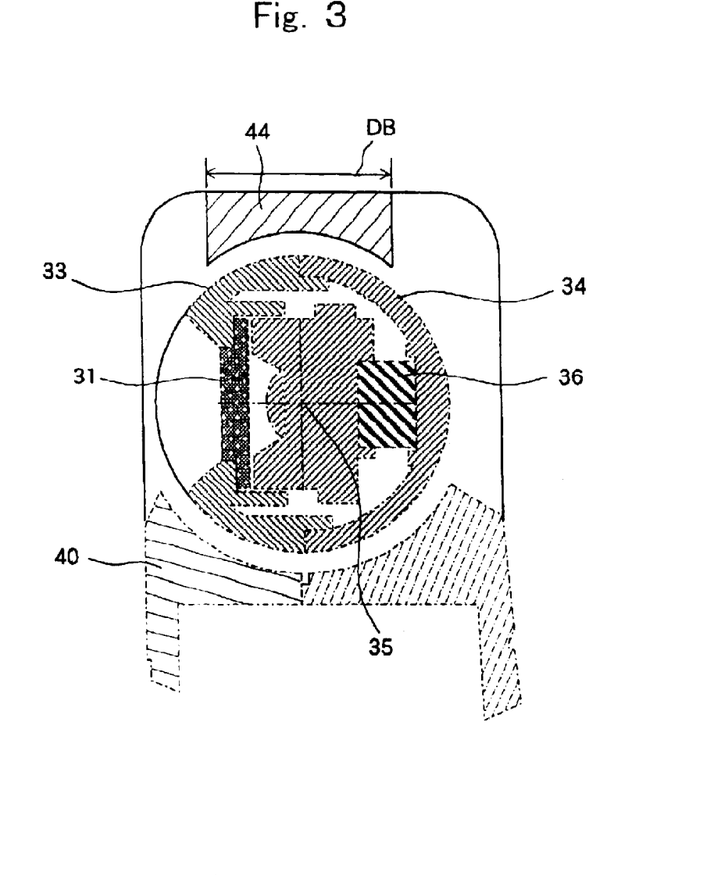
FIG. 3 is an enlarged cross sectional view showing the relation between the camera and the casing in their states shown in FIG. 2(A).
Figure 4A:
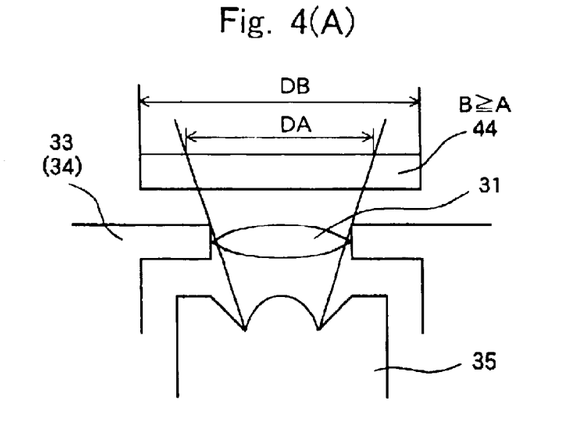
FIG. 4(A) is an enlarged cross sectional view for explaining the relation between the possible shooting range (viewing angle) of the camera in a state shown in FIG. 2(B) and the width of a bridge portion of the casing.
Figure 4B:
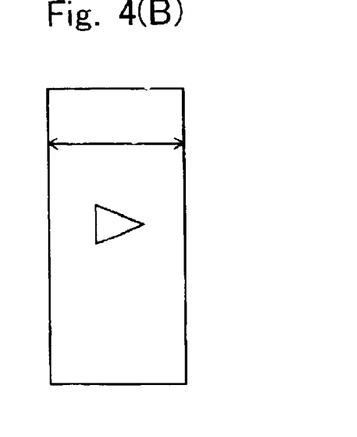
FIG. 4(B) is a view showing an example of a pattern arranged on a back side of the bridge portion.
Figure 5A:
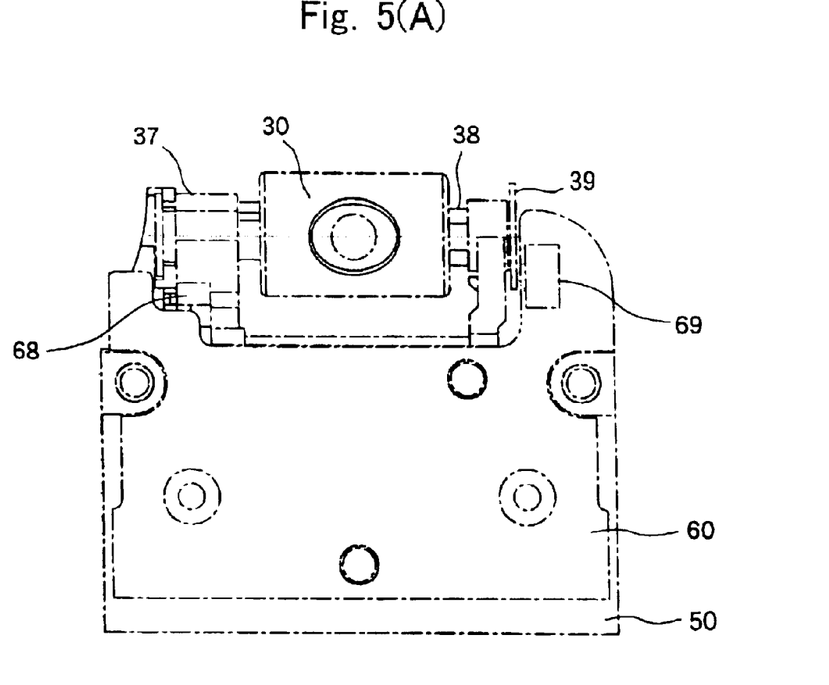
FIG. 5(A) is an external view of a holding structure for the camera in the state of FIG. 2(A) seen from the front side of the casing.
Figure 5B:
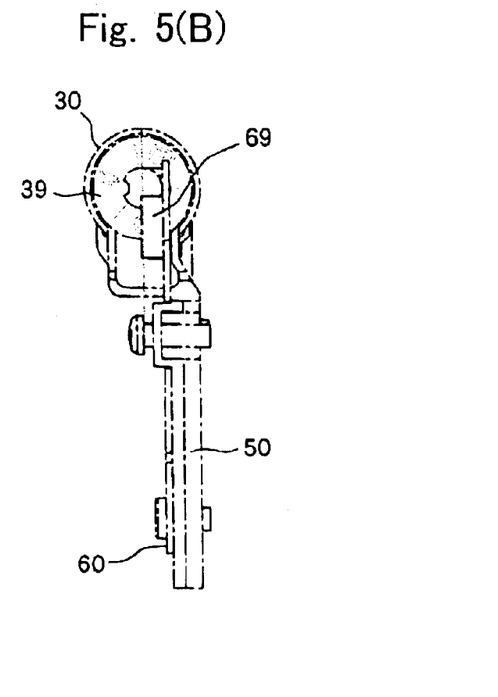
FIG. 5(B) is a right side view of FIG. 5(A).

FIG. 1 is an external view illustrating a portable electronic device constructed in accordance with a first embodiment of the present invention. FIG. 2(A) is a view showing the state in which the lens of a camera is directed to a front side of a casing in the portable electronic device of FIG. 1. FIG. 2(B) is a view showing the state in which the lens of the camera is turned to an upper peripheral side of the casing in the portable electronic device of FIG. 1. FIG. 3 is an enlarged cross sectional view of the camera that shows the relation between the camera in the state shown in FIG. 2(A) and the casing. FIG. 4 is an enlarged cross sectional view for explaining the relation between the possible shooting range (viewing angle) of the camera in the state shown in FIG. 2(B) and the width of a bridge portion of the casing. FIG. 5(A) is an external view that shows a holding structure for the camera in the state of FIG. 2(A) as seen from the front side of the casing. FIG. 5(B) is a right side view of FIG. 5(A).

The portable electronic device, which is illustrated in FIG. 1 and generally designated at reference numeral 100, is a data transmission and reception apparatus of the portable type with a display 10 for displaying various kinds of images being arranged on a front central part thereof. Also, a variety of operation buttons 20 for switching necessary for various operations are arranged around the display 10. A space penetrating from the front to the rear side of a casing or main body 40 of the device 100 is provided in an upper central part thereof with a camera 30 of a cylindrical external appearance being disposed in the space for free forward and reverse rotation about a horizontal axis. In this case, an upper side of the camera 30 is covered with a bridge portion 44 forming a part of the casing 40. A clearance or gap defined between the bridge portion 44 and the upper peripheral side of the camera 30 is reduced to such a smallest possible size as not to obstruct the rotation or turning of the camera 30. (Alternatively, a soft cushioning member may be employed to plug the gap so that much light can not enter the lens of the camera 30 from the gap.) Thus, the outer peripheries of the camera 30 are enclosed with the casing 40 and the bridge portion 44 except for the front side and the rear side thereof.

In the above-mentioned construction, the casing 40 has a front wall 40a, a rear wall (i.e., back side wall in FIG. 1) 40b, and four end or side walls 40c that connect the end or side portions of these front and rear walls 40a, 40b. The camera 30 is disposed in the penetrating space in the casing 40 between the front wall 40a and the rear wall 40b thereof so as to be rotatable in a direction from the front wall 40a to the rear wall 40b or vice versa. The display 10 is arranged on the front wall 40a of the casing 40, and a first window 40d is formed in the front wall 40a of the casing 40 so as to allow the camera 30 to be presented to the outside of the casing 40 as well as to be turned or rotated by the user. Also, a second window 40e is formed in the rear wall 40b of the casing 40 so as to allow the camera 30 to be presented to the outside of the casing 40 as well as to be turned or rotated by the user. The bridge portion 44 is arranged to form a part (e.g., an upper frame section in FIG. 1) of a frame for each of the first window 40d and the second window 40e at a side thereof near one end wall 40c (i.e., upper end edge of the casing) of the casing 40.

In addition, the first window 40d is arranged to extend from the front wall 40a to the one (upper) end wall 40c, and the second window 40e is also arranged to extend from the rear wall 40b to the one (upper) end wall 40c. Further, the one end wall 40c has a depth or thickness equal to the length or distance between the front wall 40a and the rear wall 40b, and a width in a direction perpendicular to that of the thickness equal to the width of each of the front wall 40a and the rear wall 40b. The bridge portion 44 extends in the widthwise direction of the one end wall 40c and has a thickness less than that of the one end wall 40c. The bridge portion 44 also has such a width that it is able to cover the whole or a part of a prescribed proportion of the shooting or picture-taking range of the camera 30 at least at a certain rotational position thereof during the time when the camera 30 is being rotated or turned to reach the bridge portion 44.

With the structure of the bridge portion 44 as described above, when the camera 30 is turned or directed to the front side (or to the rear side) as shown in FIG. 1 or FIG. 2(A), the field of view of the lens 31 of the camera 30 is not disturbed by the bridge portion 44. However, when the lens 31 is turned to the upper side as shown in FIG. 2(B), the entire field of view of the lens 31 is covered by the bridge portion 44. In order to change the direction of the lens 31 of the camera 30, the user needs only to turn the camera 30 in the directions indicated at an arrow RR by pushing an outer peripheral portion of the camera 30 by his or her finger through the first window 40d or the second window 40e for instance.

In this connection, it is to be noted that the camera 30 may be arranged to rotate through an angle of 360 degrees, but there is no sense in taking pictures of lower portions of the casing or main body 40, and hence in this example, the angle of rotation of the camera 30 through which the lens 31 of the camera 30 can be rotated downwardly (or forwardly) or upwardly (i.e., rearwardly) from its horizontal forward position at the front side is set to be within about 270 degrees in total, i.e., from a position of a downward rotational angle or inclination of 90 degrees (camera storage position) in which the lens 31 is directed in a vertically downward direction to a horizontal rearward position in which the lens 31 is directed in a horizontally rearward direction.

Although in the above explanation, the bridge portion 44 has been described as part of the casing 40, it may be a separate member having rigidity. That is, the camera 30 is arranged in a concave portion, which is cut out from an outer peripheral portion of the casing 40 to a prescribed depth, so as to be rotatable in a forward and a reverse direction, with the cut-out outer peripheral portion being covered by the bridge portion 44 comprising the separate member which is formed separately from the casing 40.

The camera 30 is constructed as shown in FIG. 3. Specifically, a camera casing of a substantially cylindrical configuration comprising a pair of camera cases 33, 34 each in a substantially semi-cylindrical shape is held between a curved inner surface of the bridge portion 44 and a corresponding curved surface of an opposed portion of the casing 40 in such a manner that it is freely rotatable in forward and reverse directions. The lens 31 of the camera 30 is mounted on the central portions of the camera cases 33, 34, respectively. A camera module 35 and a presser member (cushion) 36 are arranged behind the lens 31. As shown in FIG. 4, when the lens 31 is turned to an upward direction, the width DB of the bridge portion 44 is set to such a size that the field of view DA of the lens 31 can be entirely covered by the bridge portion 44 at least at a certain angular position of the lens 31. The purpose of such an arrangement is to make the user clearly know or recognize that the shooting or viewing direction of the camera 30 has been changed to the front side or the rear side. Here, note that FIG. 4(B) shows a pattern which is provided on a bottom surface of the bridge portion 44, and which will be described later with respect to a fifth embodiment of the present invention.

On the other hand, the width DB of the bridge portion 44 should not be set to too large a value which would reduce the shooting ranges of the camera 30 at the front side and the rear side thereof or deteriorate operability or usability in rotating the camera 30. The width of the bridge portion 44 in this embodiment is set to such a value as to cover the whole field of view DA of the lens 31. However, even if the whole field of view DA is not covered, a prescribed proportion of a full range of the field of view may instead be covered so as to allow the user to carry out the visual recognition of a change in the shooting direction of the camera from the front side to the rear side or vice versa.

Furthermore, in correspondence to such a setting of the width DB of the bridge portion 44, it is necessary to appropriately set the thickness of the bridge portion 44 to keep its desirable strength so that the camera 30 can be protected against damage when the portable electronic device 100 is dropped by mistake. Note that it is preferable to set the thickness of the casing 40 of the portable electronic device 100 to be slightly larger than the outside diameter of the camera 30 in order to avoid an impact imposed thereon from the front side or the rear side of the casing upon dropping of the portable electronic device 100.

Additionally, the support structure for the camera 30 will be briefly explained below while referring to FIG. 5(A) and FIG. 5(B). A bearing 37 is mounted on one end of a rotation shaft of the camera 30, and a hinge module 38 is also mounted on the other end of the rotation shaft. The camera 30 is rotatably supported on the casing 40 by attaching the bearing 37 and the hinge module 38 to a chassis 50 fixedly secured to the casing 40. Here, the camera case 33, the bearing 37 and the hinge module 38 together constitute a rotational operation mechanism according to the present invention. A printed circuit board 60 is mounted on the chassis 50, and a photosensor 69 is mounted on that portion of the printed circuit board 60 which is in opposition to the hinge module 38. It is possible to detect the direction of the camera 30 by detecting the rotational position of a reflector 39 which is mounted on one end of the rotation shaft of the camera 30 lying at the hinge module 38 side. Note that an image output or the like of the camera 30 is supplied to the printed circuit board 60 by way of a flexible cable 68 arranged in a portion of the bearing 37.

Embodiment 2.

Figure 6:
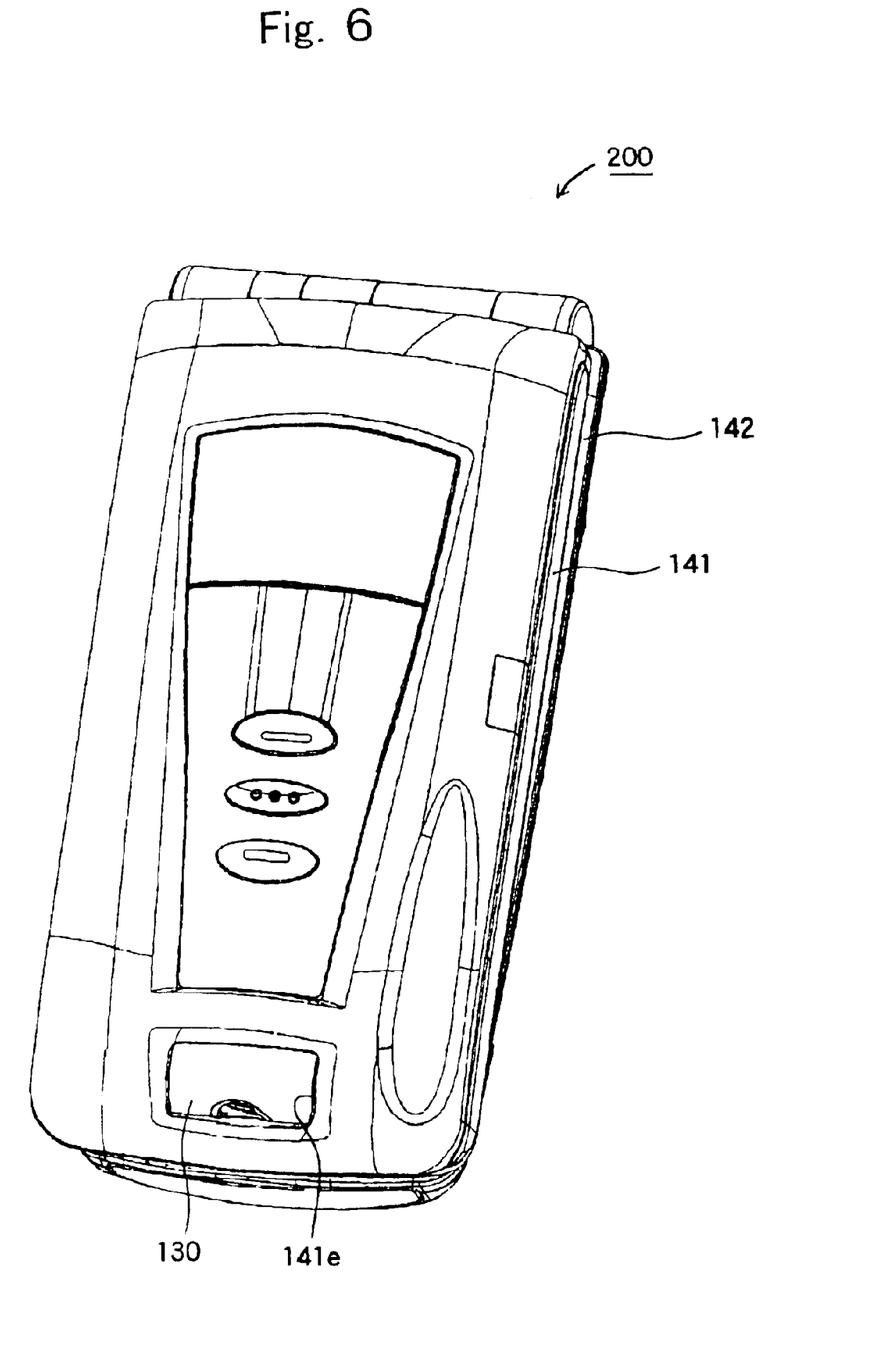
FIG. 6 is an external view showing a foldable mobile phone in its folded state, which is one example of a portable electronic device according to a second embodiment of the present invention.
Figure 7:
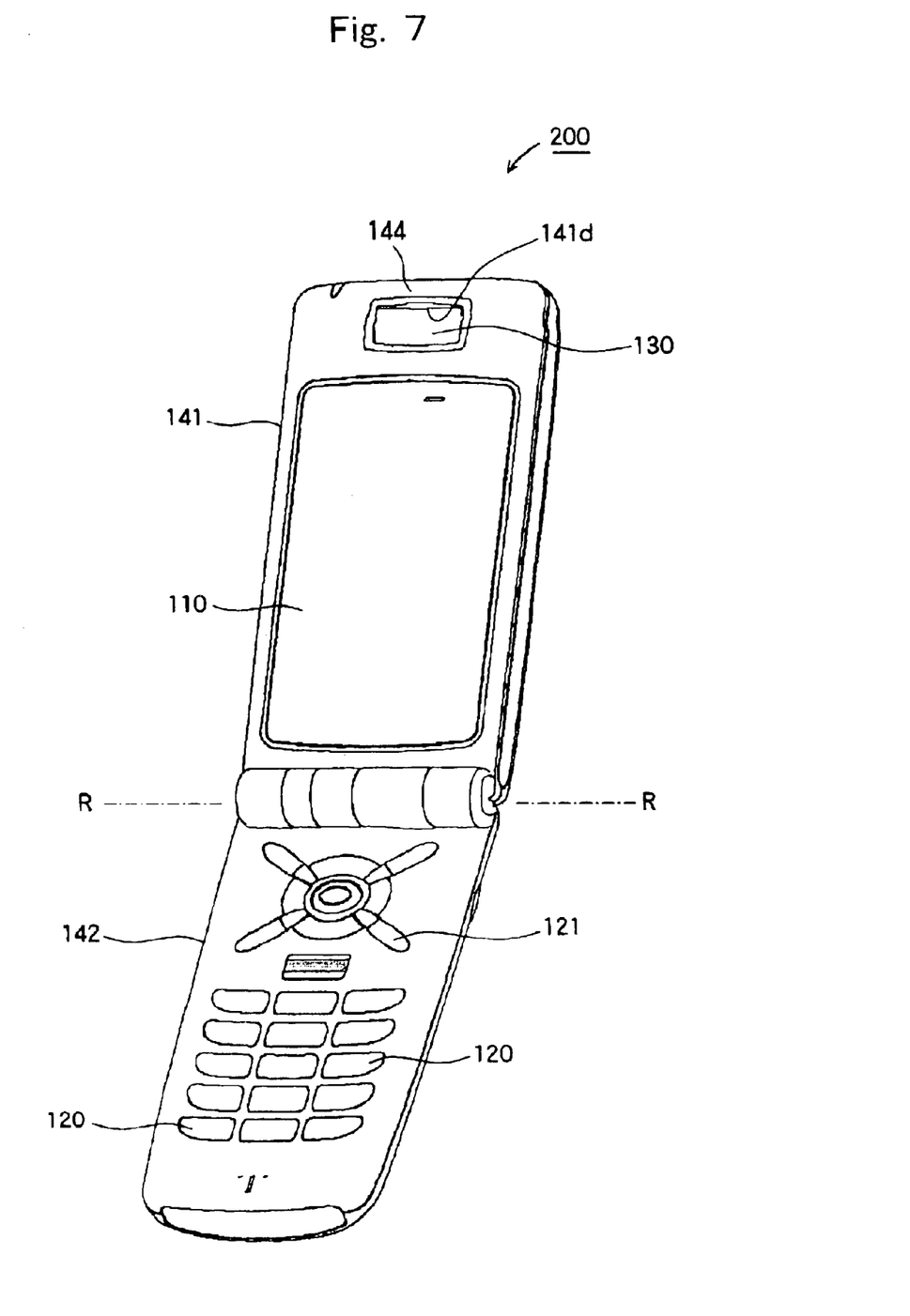
FIG. 7 is an external view showing the mobile phone of FIG. 6 in its opened state for the purpose of use.

Next, reference will be made to a second embodiment of the present invention. FIG. 6 is an external view showing that a portable electronic device of the present invention in the form of a foldable mobile phone, generally designated at reference numeral 200, is in its folded state. FIG. 7 is an external view showing that the mobile phone 200 having an image display panel 141 and a switch operation panel 142 of FIG. 6 is opened for use about a rotation shaft indicated at a line R—R. As shown in FIG. 7, in the mobile phone 200 of this embodiment, a camera 130 is disposed in a space defined between a display 110 arranged on the image display panel 141 and a bridge portion 144 at an upper outer edge or peripheral portion of a casing of the image display panel 141. Switches 120, 121 for various operations are arranged on the switch operation panel 142. In FIG. 7, the camera 130 is mounted on the image display panel 141 in such a manner that it is freely rotatable in a forward direction as well as in a reverse direction about a shaft or an axis extending in a transverse direction perpendicular to the longitudinal direction of the mobile phone 200 (i.e., the longitudinal direction of the image display panel 141), i.e., an axis extending in parallel to the axis R-R corresponding to the rotation or folding shaft of the mobile phone 200 (camera horizontal mounting).

Here, note that in this embodiment, the image display panel 141 corresponds to the casing 40 in the first embodiment. A structure for supporting the camera 130 on the image display panel 141 is similar to the structure that supports the camera 30 on the casing 40 in the aforementioned first embodiment. Windows 141d, 141e through which the camera 130 views the outside are formed in a front wall of the image display panel 141 provided with the display 110 and in a rear wall of the image display panel 141, which is the rear surface of the front wall, respectively. These structures are similar in the following embodiments, too.

Embodiment 3.

Figure 8:
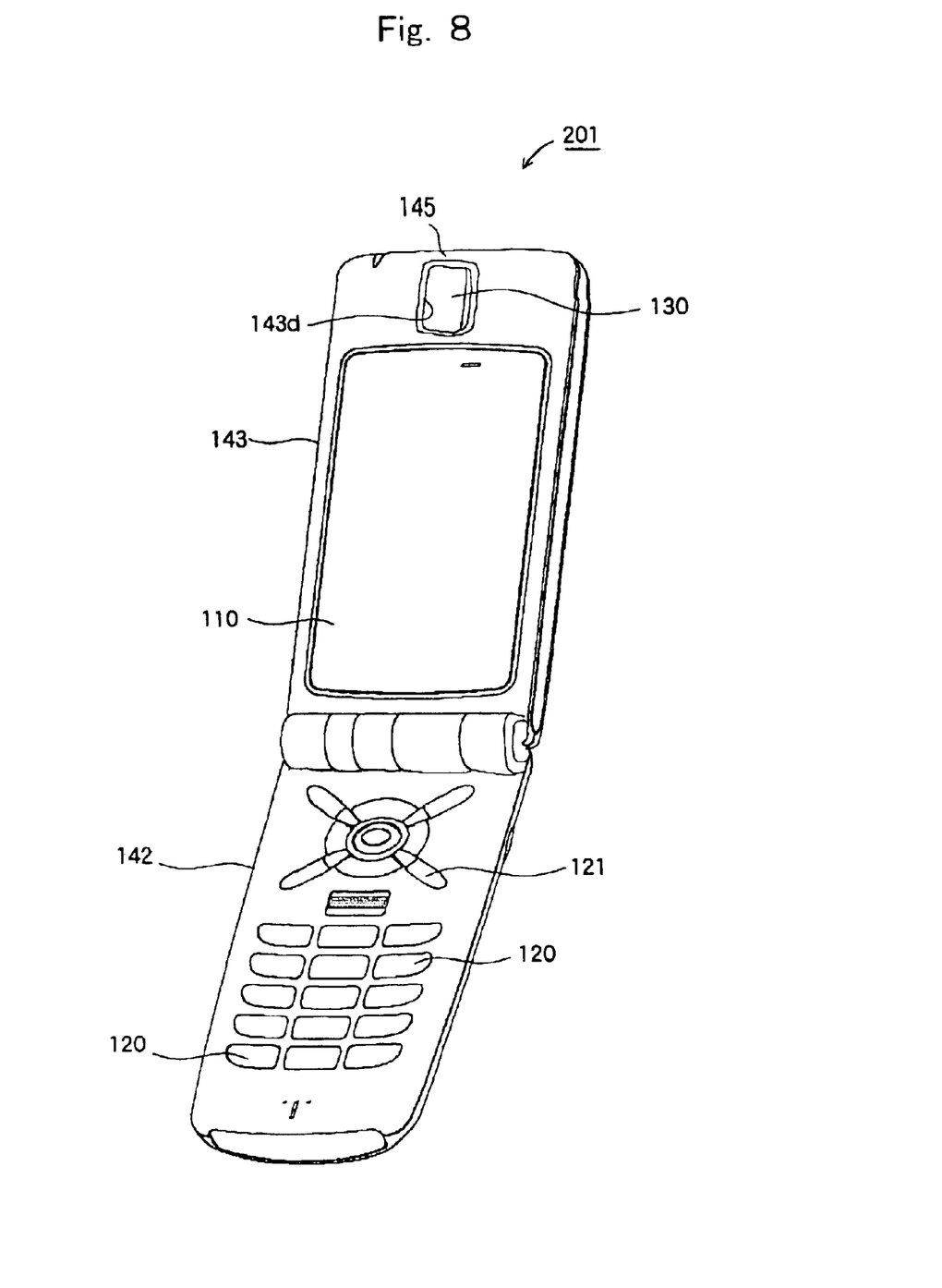
FIG. 8 is an external view showing a mobile phone in accordance with a third embodiment of the present invention.

FIG. 8 is an external view showing a mobile phone, generally designated at reference numeral 201, according to a third embodiment of the present invention. In the mobile phone 201 shown in FIG. 8, a camera 130 is installed in a space defined between a display 110 arranged on an image display panel 143 and a bridge portion 145 in an upper edge or peripheral portion of the image display panel or casing 143 so as to view the outside through a first window 143d or a second window (not shown) formed in the front and rear surfaces, respectively, of the image display panel 143. In the mobile phone 201 shown in FIG. 8, the camera 130 similar to the one shown in FIG. 7 is mounted on the image display panel 141 so as to be rotatable about an axis extending in a longitudinal direction of the mobile phone 201 (i.e., a longitudinal direction of the casing or image display panel 143). Specifically, the direction of a rotation shaft of the camera 130 shown in FIG. 8 is different by an angle of 90 degrees from the direction of the rotation shaft of the camera 130 shown in FIG. 7. Accordingly, unlike the bridge portions 44, 144 shown in FIGS. 1 and 7, the bridge portion 145 of FIG. 8 does not have a function of informing the user of a switching of the viewing direction of the camera 130 from the front side into the rear side of the mobile phone 201 or vice versa, but it serves to protect the camera 130 against damage when the mobile phone 201 is dropped. In this case, it is possible to make the user visually know the switching of the viewing direction of the camera 130 by using a part (peripheral side portion) of the casing or image display panel 143 lying at the right or left side of the camera 130. Also, in this case, an image taken by the camera 130 is an erect one both at the front side and at the rear side, so it is unnecessary to invert the image in any manner.

Embodiment 4.

Figure 9:
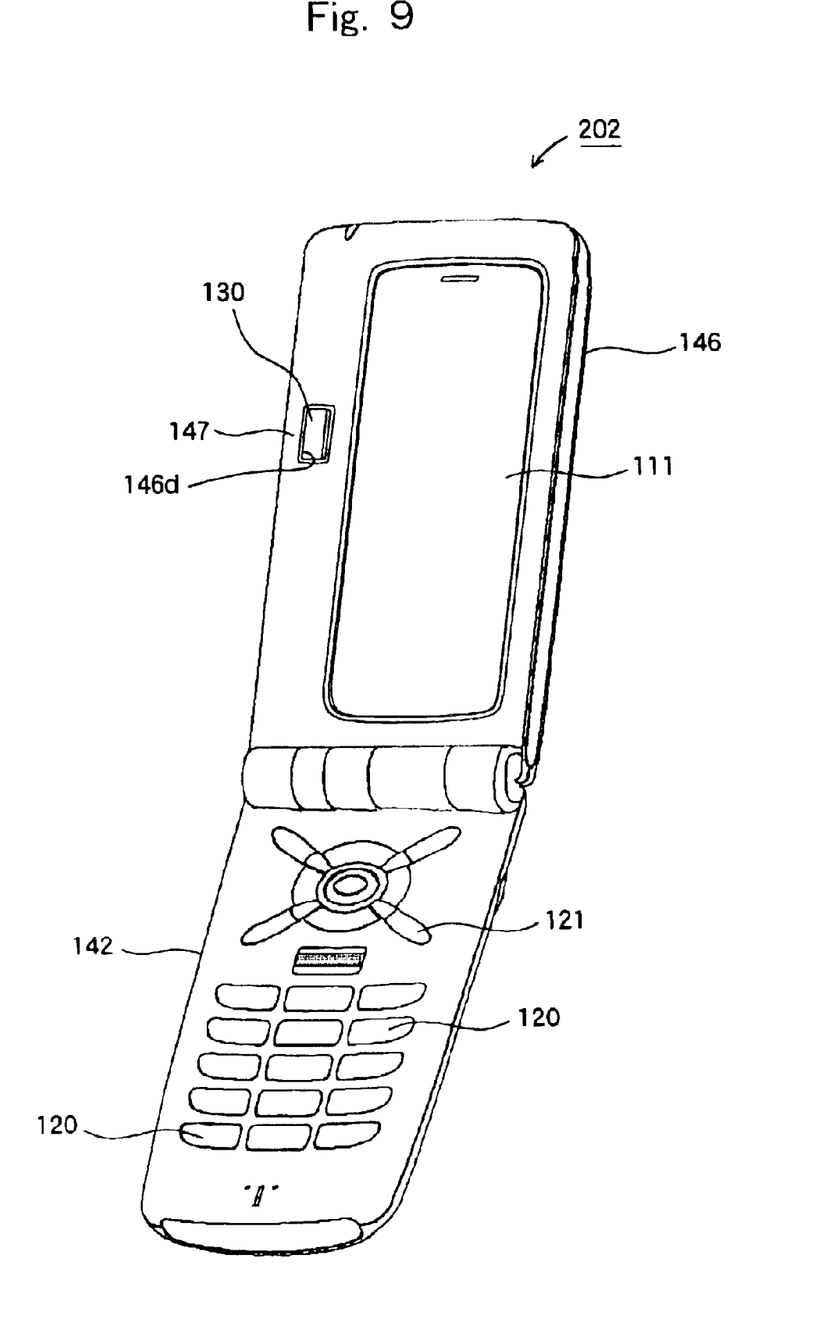
FIG. 9 is an external view showing a mobile phone in accordance with a fourth embodiment of the present invention.

FIG. 9 is an external view illustrating a mobile phone, generally designated at reference numeral 202, according to a fourth embodiment of the present invention. In the mobile phone 202 shown in FIG. 9, a camera 130 is installed in a space defined between a display 111 arranged on an image display panel 146 and a bridge portion 147 in a left-side edge or outer peripheral portion of the image display panel or casing 146 so as to view the outside through a first window 146d or a second window (not shown) formed in the front and rear surfaces, respectively, of the image display panel 146. In the mobile phone 202 shown in FIG. 9, the camera 130 similar to the one shown in FIG. 8 is mounted on the image display panel 141 for forward and rearward rotation about an axis extending in a longitudinal direction of the mobile phone 202 (i.e., a longitudinal direction of the casing or image display panel 143), i.e., an axis perpendicular to a rotation or folding shaft of the foldable mobile phone 202. Thus, similar to the bridge portions 44, 144 shown in FIG. 1 and FIG. 7, respectively, the bridge portion 147 of FIG. 9 can be used to make the user know a switching of the viewing direction of the camera 130 from the front side into the rear side of the mobile phone 202 or vice versa, and at the same time to perform the role of protecting the camera 130 against damage when the mobile phone 202 is dropped.

Embodiment 5.

Now, reference will be made to one example of a method for detecting a switching of the viewing direction of a camera from the front side into the rear side or vice versa in the above-mentioned respective embodiments. This method is carried out by an unillustrated control part. According to this method, the bridge portion is provided with a pattern (e.g., an isosceles triangular pattern (▲) with its base arranged perpendicular to the widthwise direction of the support portion: see FIG. 4(B)) by which the user can recognize the rotational direction of the camera when the lens of the camera is positioned in opposition to the bridge portion. (In this case, it is desirable that a small amount of light be introduced so as to enable a reading of the triangular pattern.)

Here, note that instead of this pattern being provided on the bridge portion, a plate with such a pattern may be arranged in place of the reflector 39 shown in FIG. 5(A), or such a pattern may be formed on the reflector 39. Also, it may be constructed such that this pattern moving during the rotation of the camera can be read by the photosensor 69.

Figure 10:
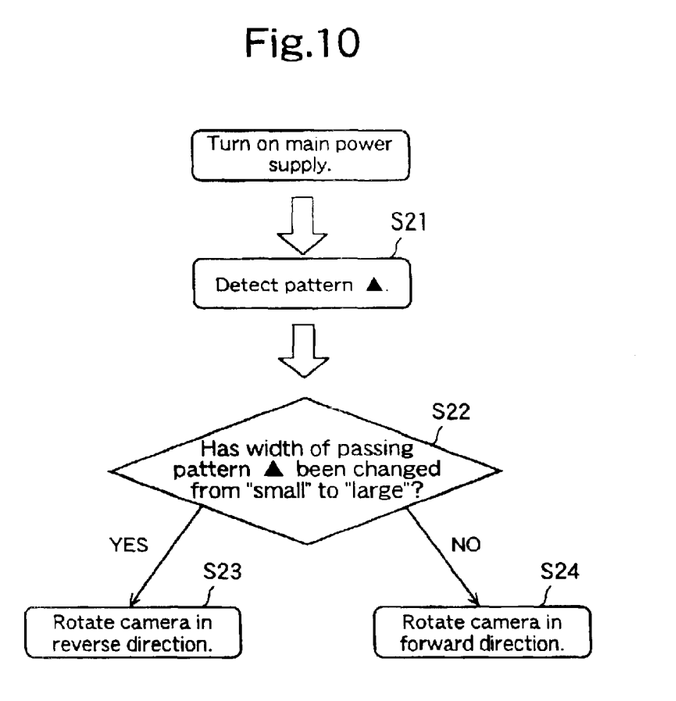
FIG. 10 is a flow chart for explaining an operation of detecting the rotational direction of a camera by reading a prescribed pattern that is passing with the rotation of the camera.

Thus, as shown in FIG. 10, when the lens of the camera passes the bridge portion during rotation of the camera, the control part detects the pattern (▲) based on a photographic image taken by the camera 30 or an output signal of the photosensor 69 (step S21). Then, it is determined whether the width of the passing pattern changes from a "small" one to a "large" one, or from a "large" one to a "small" one (step S22). Based on this determination, a decision of the reverse rotation of the camera (step S23) or a decision of the forward rotation of the camera (step S24) is made.

Based on this decision, an indication is made on the display that the shooting or picture-taking plane of the camera is switched over from the front side into the rear side or vice versa. Alternatively, instead of making such an indication, the control part may control the display in such a manner that the photographic image taken by the camera is always displayed on the display as an erect image by automatically turning an inverted image upside down.

Embodiment 6.

Here, note that even if no pattern is provided, when the lens of the camera comes to a position opposite to the bridge portion during rotation of the camera, the field of view of the camera is covered by the bridge portion, causing the photographic image taken by the camera to darken to an extreme extent, and thereafter the photographic image becomes light again in accordance with further rotation of the camera. Thus, by detecting a change in the lightness of the photographic image, the control part may determine that the direction of the camera has been changed from the front side to the rear side or vice versa, and hence make an indication on the display to the effect that the shooting or picture-taking plane of the camera has been accordingly switched.

Figure 11:
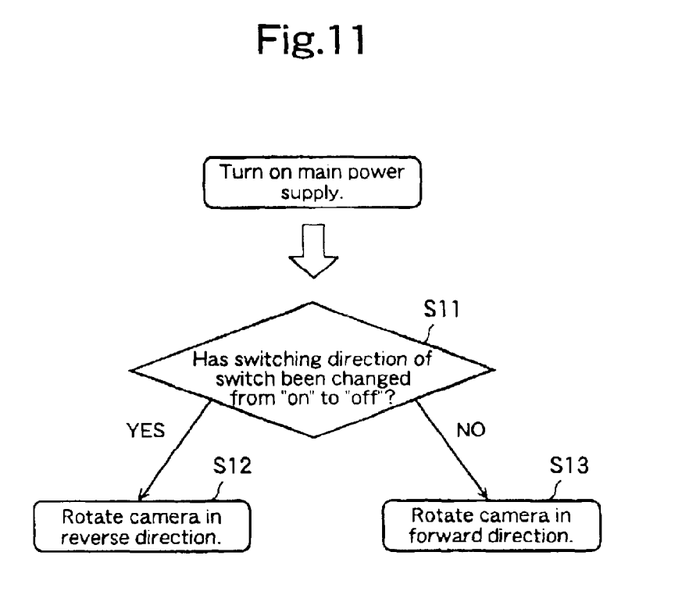
FIG. 11 is a flow chart for explaining an operation of detecting the rotational direction of the camera by the use of a switch.

In the foregoing, reference has been made to the case where control on the display is carried out based on the photographic image of the bridge portion, but a switching of the viewing direction of the camera from the front side to the rear side or vice versa can be detected mechanically so that the display can be controlled based on the result of such mechanical detection. For instance, though not illustrated, a switch, which is turned on and off by depression and release of an actuator in the form of a protrusion or the like, is provided on one of the casing and the camera, and a cam member is mounted on the other for operating the actuator in accordance with the rotation of the camera. A more concrete example may be constructed as follows. That is, when the camera is at an angular position where it is directed to the front side, the actuator of the switch is not pushed or depressed so much by the cam member that the switch is in an off state, whereas when the camera is at an angular position where it is turned to the rear side, the actuator of the switch is strongly pushed to turn the switch on by means of the cam member. Accordingly, the control part determines whether the switch has been changed from an "ON" state to an "OFF" state or from an "OFF" state to an "ON" state, as shown in FIG. 11 (step S11). Based on this determination, a decision of the reverse rotation of the camera is made (step S12) or a decision of the forward rotation of the camera is made (step S13). Further, it is preferable that based on this decision, the control part provides an indication on the display to the effect that the shooting or picture-taking plane of the camera has been changed from the front side to the rear side or vise versa.

As can be seen from the foregoing description, a portable electronic device according to the present invention as constructed above provides the following advantages. That is, a camera arranged in a casing of the portable electronic device has a structure where the outer peripheries of the camera are covered or enclosed with the casing except for the front and rear sides thereof. For instance, all the outer peripheral sides of the camera excepting those corresponding to the front and rear sides of the casing are covered with the casing and a bridge portion connected with the casing. As a result, an impact applied to the camera from a peripheral side of the casing adjacent to the bridge portion can be blocked by the bridge portion. In addition, when the camera is rotated to move the shooting or picture-taking plane thereof to the front side or the rear side of the casing, it takes a picture of the bridge portion so that an image of the bridge portion is displayed on a display. Thus, for example, the image on the display becomes dark temporarily or at a time, and hence the user is able to clearly learn or recognize that the camera has passed an image-inversion or upright position, whereby it is possible to prevent a misrecognition of the image on the display at the front side or at the rear side in the vicinity of the image-inversion or upright position of the camera.

Moreover, by taking a picture of a part of the casing, it is possible to provide the user with an instruction for switching the image display mode of the display into an appropriate one, or to automatically change an inverted image on the display into an erect image.

While the invention has been described in terms of preferred embodiments, those skilled in the art will recognize that the invention can be practiced with modifications within the spirit and scope of the appended claims.

What is claimed is:

1. A portable electronic device including a camera rotatably mounted on a casing having a front wall and a rear wall, and a display for displaying thereon an image taken by said camera at the front wall of said casing, wherein said camera is arranged in said casing at a location between the front side and the rear side thereof;

said casing has a pair of windows which are formed in, and enclosed on their peripheries by, the front and rear walls thereof, respectively, said camera is rotated by the user through respective openings in said pair of windows and allowed to view the outside of said casing so as to ensure its field of view; and said camera is rotatably supported on said casing through a rotational operation mechanism which is rotated using said pair of windows formed in the front and rear walls, respectively, thereby changing a direction of view of said camera in a range between a direction of said front wall and a direction of said rear wall.

2. A portable electronic device comprising:

a casing having a front wall and a rear wall;

a camera disposed in a space between said front and rear walls of said casing so as to be rotatable in a direction from said front wall to the rear wall or vice versa;

a display provided on said front wall of said casing for displaying thereon an image taken by said camera;

a first window which is formed in said front wall of said casing and through which said camera is able to view the outside of said casing and said camera rotated using said first window;

a second window which is formed in said rear wall of said casing, and through which said camera is able to view the outside of said casing and said camera rotated using said second window; and a bridge portion disposed in a peripheral portion of said casing connecting between said front and rear walls of said casing for forming a part of each of frames for said first and second windows, wherein the user rotates the camera through an opening in one of the first window and the second window.

3. The portable electronic device as set forth in claim 2, wherein said casing has an end wall in said peripheral portion of said casing for connecting between corresponding ends of said front wall and said rear wall;

said first window is formed to extend from said front wall to said end wall; and said second window is also formed to extend from said rear wall to said end wall.

4. The portable electronic device as set forth in claim 3, wherein said end wall has a thickness equal to a distance between said front wall and said rear wall, and a width in a direction perpendicular to a thicknesswise direction; and said bridge portion extends in the widthwise direction of said end wall and has a thickness less than that of said end wall.

5. The portable electronic device as set forth in claim 2, wherein said bridge portion has such a width that it is able to cover the whole or a part of a prescribed proportion or more of the shooting range of said camera at least at a certain rotational position of said camera during the time when said camera is being rotated to reach the bridge portion.

6. The portable electronic device as set forth in claim 2, wherein said bridge portion includes a prescribed pattern, a picture of which is to be taken by said camera.

7. The portable electronic device as set forth in claim 2, wherein said bridge portion is integrally molded to said casing.

8. The portable electronic device as set forth in claim 2, wherein an image display panel with said display mounted thereon and a switch operation panel with a switch mounted thereon are integrally connected with each other in a foldable manner; and said camera is disposed between said display and an outer peripheral portion of said casing of said image display panel.

9. The portable electronic device as set forth in claim 8, wherein said camera is rotatable about an axis which is parallel to a folding axis about which said image display panel and said switch operation panel are foldable with respect to each other.

10. The portable electronic device as set forth in claim 8, wherein said camera is rotatable about an axis perpendicular to a folding axis about which said image display panel and said switch operation panel are foldable with respect to each other.

11. A portable electronic device comprising:

a casing having a front wall and a rear wall;

a camera disposed in a space between said front and rear walls of said casing so as to be rotatable in a direction from said front wall to the rear wall or vice versa;

a display provided on said front wall of said casing for displaying thereon an image taken by said camera;

a first window which is formed in said front wall and through which said camera is able to view the outside of said casing;

a second window which is formed in said rear wall and through which said camera is able to view the outside of said casing;

a bridge portion disposed in a peripheral portion of said casing connecting between said front and rear walls of said casing for forming a part of each of frames for said first and second windows; and a control part for performing prescribed control based on an image of said bridge portion taken by said camera.

12. The portable electronic device as set forth in claim 11, wherein said bridge portion includes a prescribed pattern which is to be photographed by said camera, said control part being operable to perform said prescribed control based on an image of said prescribed pattern taken by said camera.

13. The portable electronic device as set forth in claim 11, wherein said control part performs an indication on said display to the effect that a shooting plane of said camera has been changed from said front side to said rear side or vice versa.

14. A portable electronic device as set forth in claim 11, wherein said control part controls said display in such a manner that an inverted image taken by said camera is turned upside down to provide an erect image on said display.

15. A portable electronic device including a camera and a display for displaying an image taken by said camera, said camera and said display being disposed in a casing, wherein said camera is disposed in, and mounted on, said casing for rotation in a direction from a front side to a rear side of said casing or vice versa;

said casing has a pair of windows formed at its front side and rear side, respectively, through which said camera views the outside of said casing; and a control part is provided for performing prescribed control based on an image of a wall of said casing which is taken by said camera and which lies between said front side and said rear side.

16. A portable electronic device including a camera and a display for displaying an image taken by said camera, comprising:

a casing having a front wall and a rear wall, said casing having a pair of windows formed in, and enclosed on their peripheries by, the front and rear walls, said pair of windows allowing a user to rotate said camera and allowing said camera to take images from a front side or a rear side of said casing; and a control part controlling said display in said portable electronic device such that said image taken by said camera from either said front side or said rear side of said casing is always displayed on said display as an upright image by automatically turning an inverted image upside down.

17. The electronic device as set forth in claim 16, wherein said casing further comprises a bridge portion disposed in a peripheral portion of said casing connecting said front and rear walls of said casing.

18. The electronic device as set forth in claim 17, wherein said bridge portion includes a prescribed pattern that is to be photographed by said rotatable camera or sensed by a photosensor.

19. The electronic device as set forth in claim 18, wherein said control part determines if a direction of said rotatable camera has changed from a front side to a rear side or vice versa based on said prescribed pattern or based on a signal sensed by said photosensor.

\* \* \* \* \*

UNITED STATES PATENT AND TRADEMARK OFFICE
CERTIFICATE OF CORRECTION

PATENT NO. : 6,922,212 B2  
DATED : July 26, 2005  
INVENTOR(S) : Koji Nakakubo et al.

It is certified that error appears in the above-identified patent and that said Letters Patent is hereby corrected as shown below:

Column 12,  
Line 7, after "camera" insert -- is --.

Signed and Sealed this

Twenty-eighth Day of March, 2006

JON W. DUDAS  
*Director of the United States Patent and Trademark Office*